July 23, 1963  A. M. SCIAKY  3,098,977
AUTOMATIC VOLTAGE COMPENSATOR FOR THREE PHASE
Original Filed Dec. 2, 1958  3 Sheets-Sheet 1
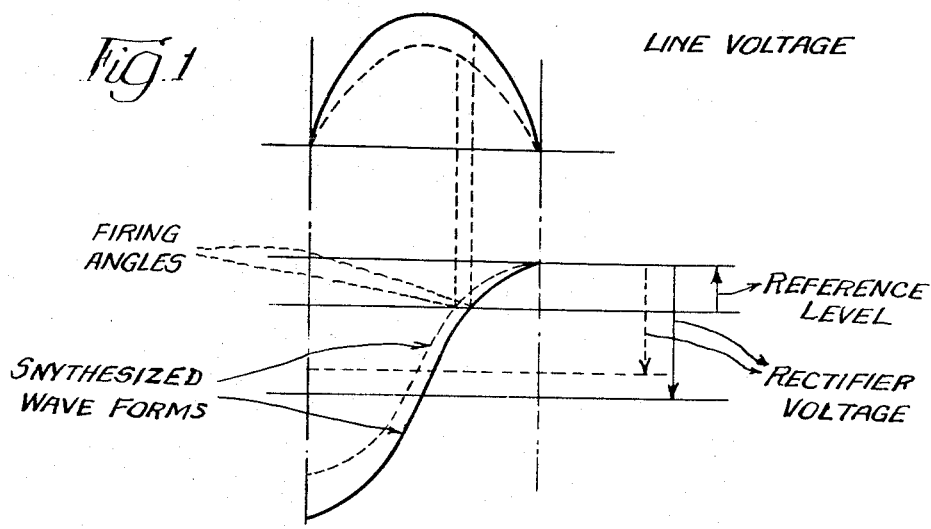
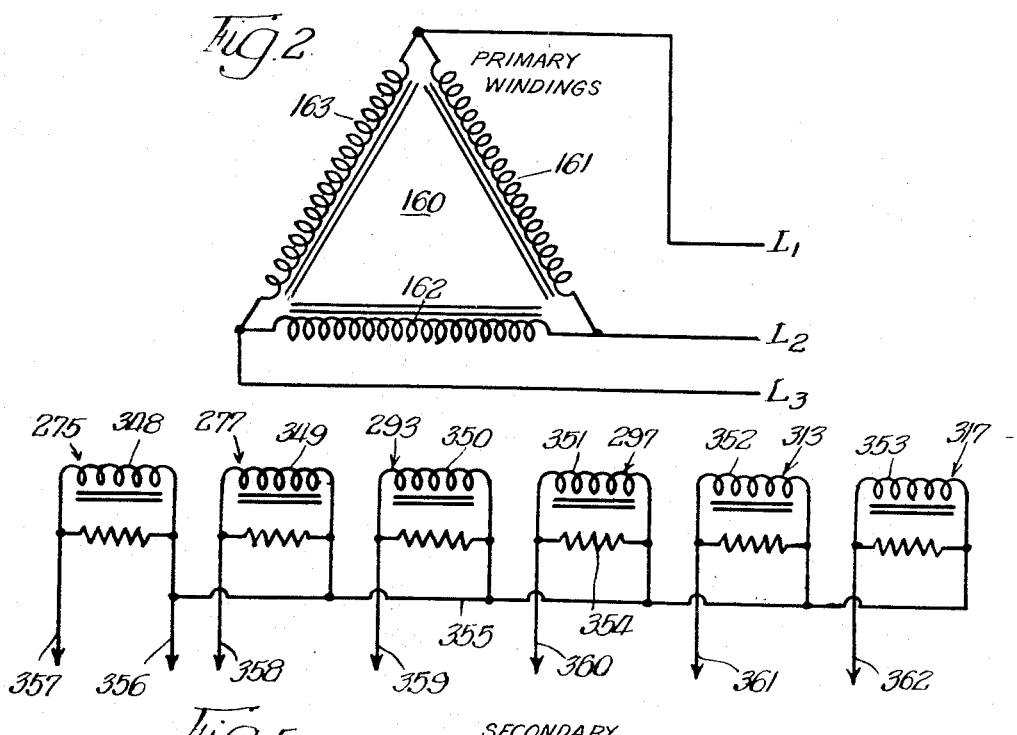
INVENTOR.
Albert M Sciaky,
BY
Byron Hume Groen & Clement July 23, 1963

A. M. SCIAKY 3,098,977

AUTOMATIC VOLTAGE COMPENSATOR FOR THREE PHASE

Original Filed Dec. 2, 1958

STAR WOUND SECONDARY

DELTA WOUND SECONDARIES

INVENTOR.
Albert M. Sciaky,
BY
Byron Hume Groen & Clement
Attys

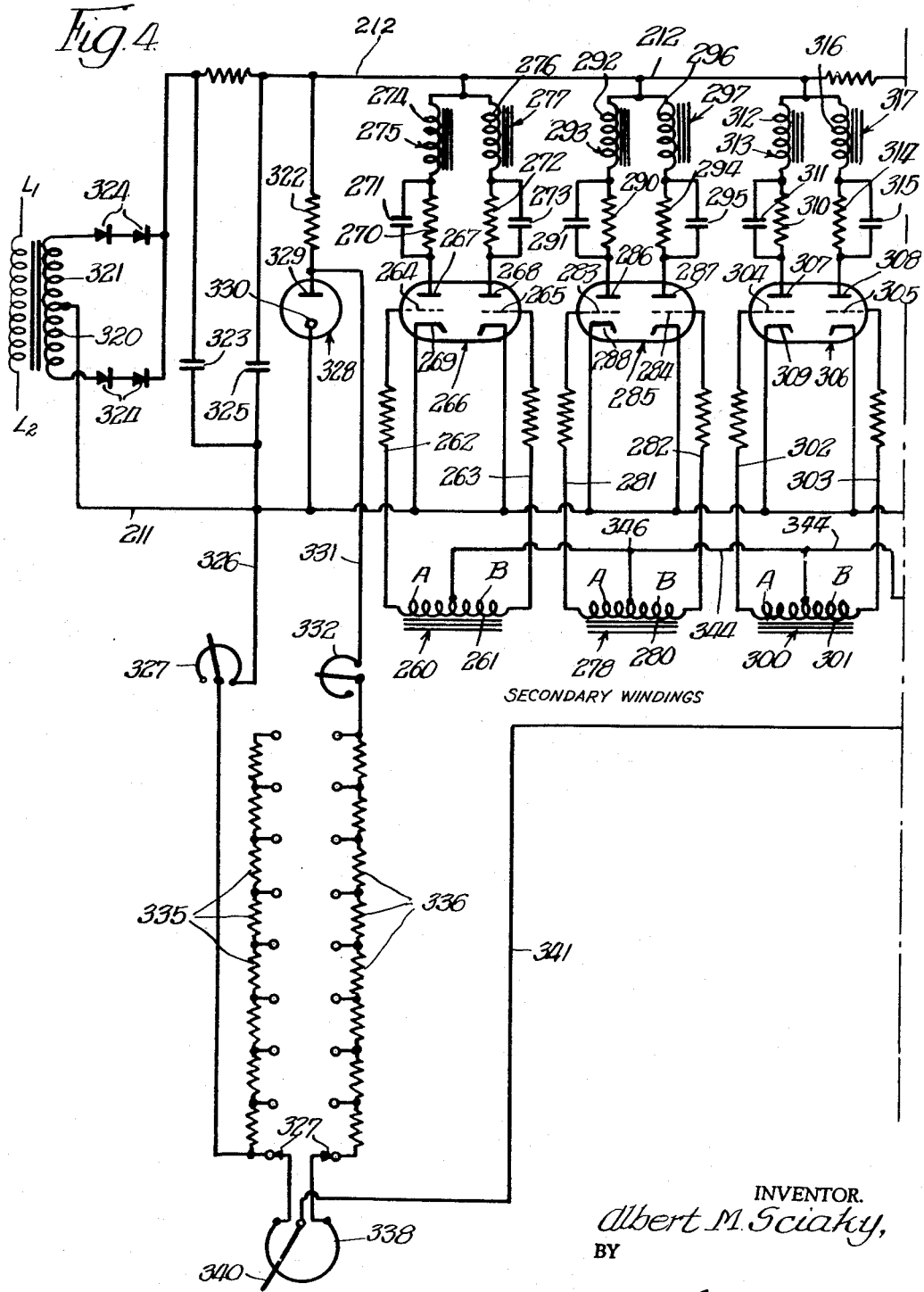

United States Patent Office 3,098,977
Patented July 23, 1963

3,098,977
AUTOMATIC VOLTAGE COMPENSATOR FOR THREE PHASE
Albert M. Sciaky, Chicago, Ill., assignor to Welding Research, Inc., Chicago, Ill., a corporation of Illinois
Original application Dec. 2, 1958, Ser. No. 777,774. Divided and this application Feb. 23, 1961, Ser. No. 91,107
6 Claims. (Cl. 328—69)

The invention relates to automatic voltage compensators embodying improved phase shift means for three phase alternating circuits, and has reference more particularly to apparatus of this nature which will automatically compensate for voltage variations in the alternating power supplied to welding machines so as to maintain the welding current at a constant value for any particular heat setting.

Welding systems have been provided with phase shift control means wherein a particular value of welding current is obtained by shifting the firing point of the ignitrons which, in turn, controls flow of the primary current to the welding transformer. Such phase shifting networks have generally required manual adjustments although some welding systems in the past have been provided with phase shifting networks which control the welding current by automatically adjusting the firing point of the ignitrons in such manner that it is a function of the line voltage or the welding current being produced.

In the present invention the variations in the voltage of the supply current are compensated for automatically by providing a voltage wave form which is synthesized from the voltage of the supply current so that its magnitude is proportional to the output of the welding machine at every phase angle in the range of firing angles of the said machine. For each cycle a firing pulse can be produced at the moment the voltage wave form reaches some predetermined pre-set value.

If the pre-set value is kept constant by means of a voltage regulator tube, a drop in line voltage will advance the firing angle and conversely an increase in line voltage will retard the firing angle, thus keeping the secondary welding current of the machine substantially constant.

An object of the invention is to provide an improved voltage compensating circuit for three phase which will incorporate new and novel electronic circuits having operation to produce firing pulses for each phase and at the proper phase angles so as to compensate for voltage variations in the three phase power source.

More particularly, according to the invention, the alternating current voltages of the three phase power supply are applied to a transformer, and the pulses from each secondary winding are filtered by resistance-capacity networks, then amplified and combined by means of a push-pull cathode follower. The output obtained from a split secondary of the cathode follower transformer is superimposed on a variable direct current voltage obtained by rectifying the alternating current supply voltage and the same constitutes the synthesized wave form as produced for a particular phase of the power supply.

A further object of the invention, based on the foregoing, is to provide a voltage compensating circuit having particular application to three-phase welding machines and wherein the firing angles are obtained by an adjustable reference voltage which, for any adjusted position, will determine the level on the synthesized wave forms at which the firing pulses will be produced.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 1 is a schematic diagram illustrating the shape of a synthesized wave form for a half cycle of conventional alternating voltage;

FIGURE 2 is a wiring diagram showing a delta connection for the primary winding of a three-phase transformer as employed for the compensating circuit of FIGURES 3 and 4;

FIGURE 4 is a schematic wiring diagram illustrating additional circuit connections which supplement those of FIGURE 3 to complete the three phase voltage compensating circuit; and FIGURE 5 is a wiring diagram schematically showing a preferred circuit arrangement for applying firing pulses to a three phase welding machine.

Figure 3:
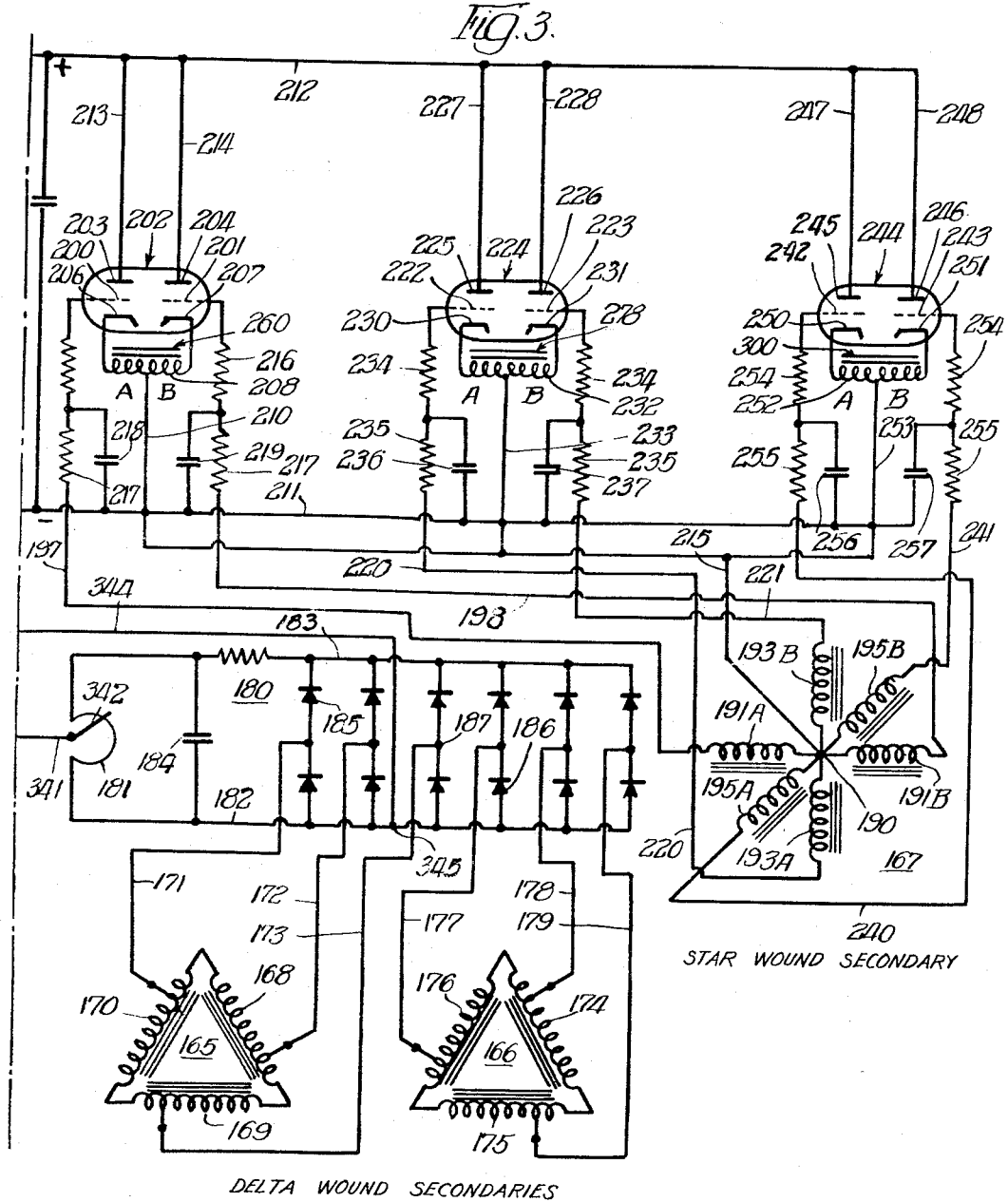
FIGURE 3 is a schematic wiring diagram illustrating in part a preferred embodiment of a three phase voltage compensating circuit coming within the invention.

Referring in particular to FIGURES 2, 3 and 4, it will be understood that the compensating circuit of the invention employs a three-phase delta connected transformer 160. Said transformer has at least two secondary windings for each primary winding, and the secondary windings have electrical connection with cooperating circuit means for producing the synthesized wave forms, including the alternating current and the direct current components, and for also producing the direct current voltage level which determines the phase shifted firing angles for the ignitrons of the welding machine.

It is first of all necessary to synthesize voltage wave forms from the alternating current voltages supplied by the power lines. The magnitude of each wave form will be proportional to the output of the welding machine at every phase angle in the range of firing angles of the machine. Such a synthesized wave form is illustrated diagrammatically in FIGURE 1. Although it is difficult to determine theoretically the required wave forms for three phase welding machines because of the non-linear characteristics of the iron in the transformer, it can be stated that the main objective is to produce a constant average current in the load, notwithstanding the variations in the source current. It is, therefore, necessary that the firing angles be such that the area under the voltage curve of the source current will be constant.

The three phase transformer 160, FIGURE 2, includes three primary windings 161, 162 and 163 connected in delta across the three phase alternating current supply lines $L_1$, $L_2$ and $L_3$, respectively. The secondaries for the three-phase transformer 160, as shown in FIGURE 3, consist of two sets of delta connected windings, such as 165 and 166, and one set of star connected windings 167. Considering first the set of windings 165, it will be seen that the same consist of secondaries 168, 169 and 170 connected in delta and having the conductors 171, 172 and 173 joined to certain taps on the windings, respectively, which accomplishes a phase-shifting of the line voltage approximately fifteen degrees in advance of normal. In a somewhat similar manner the set of windings 166, consisting of the secondaries 174, 175 and 176, is likewise delta connected, and the conductors 177, 178 and 179 are joined thereto at certain taps to accomplish a retarded phase-shifting of the line voltages approximately fifteen degrees. The reason for the particular tap connections to the delta connected secondaries is to produce a high frequency ripple in the rectified direct current output of the rectifier generally designated by numeral 180, to be presently described in detail. As a result of the high frequency ripple, which is in this case seven hundred and twenty per second, a direct current is obtained which has very little fluctuation, and which in addition will vary as the amplitude of the supply voltage may vary. This is an important feature of the invention, since as the rectified voltage varies the synthesized waveforms will shift their position relative to the direct current reference level, thereby either advancing or retarding the firing angles.

The rectifier 180 includes the potentiometer 181 and the connecting conductors 182 and 183. In addition to the condenser 184 a plurality of series-connected rectifiers, such as 185 and 186, are connected across the conductors in parallel relation and accordingly the flow of current as permitted by the rectifiers is from the negative conductor 182 to the positive conductor 183. Since the secondary winding leads 171, 172 and 173 for the secondary 165, and the leads 177, 178 and 179 for the secondary 166 are connected at 187 between each of the rectifiers 185 and 186, the system will deliver a direct current output having a high frequency ripple of small fluctuations and wherein the magnitude of the voltage will vary as the polyphase power supply may vary in voltage. The said output of the rectifier 180 comprises the direct current component of the synthesized waveforms, as will be fully understood as the description proceeds.

The third set of secondary windings for the transformer 160 comprises a six-phase star connection and the same is produced by joining the center taps of three secondary windings to a common terminal. For example, the windings 191A and B are joined to the common terminal 190 as are also windings 193A and B and windings 195A and B. The conductors 197 and 198 connect the windings 191A and B through the resistors 216 and 217 to the grids 200 and 201, respectively, of an electronic tube 202 generally referred to as a cathode follower. The tube is of the dual triode, hot cathode type such as a 6463 which is characterized by a low internal voltage drop when conducting. The tube 202 has two plates 203 and 204 and two cathodes 206 and 207. The tube is connected for push-pull operation and accordingly the two cathodes are joined to a winding 208 which is center tapped by the conductor 210 which connects with the negative conductor 211 of the direct current source. The positive conductor 212 of the direct current source is connected by means of conductors 212 and 214 to the plates 203 and 204 of the cathode follower tube 202. The conductor 210, which center taps the winding 208, is joined by means of conductor 215 to the common terminal 190 of the six-phase star connected secondary.

Referring again to the conductors 197 and 198, it will be seen that they each feed a resistance capacity filter located in advance of the grids and which includes the series connected resistors 216 and 217 and the condensers 218 and 219, each condenser being connected on one side of the junction of the resistors 216 and 217 and on the other side of the center tap 190. Since it is difficult to select components for the resistance-capacity filters having identical values, it will be understood that the wave forms from windings 191A and B, as delivered to the grids 200 and 201, may not be precisely one hundred and eighty degrees opposed. However, any discrepancy will be taken care of by the cathode follower system so that the wave forms delivered by the secondary of windings 208A and 208B will have a polarity which will be precisely opposed to each other.

Windings 193A and B are similarly connected by conductors 220 and 221 to the grids 222 and 223, respectively, of the cathode follower tube 224. The plates 225 and 226 of the said tube are joined by conductors 227 and 228 to the positive conductor 212 of the direct current source. The cathodes 230 and 231 connect with the winding 232 which is center tapped by conductor 233 and connected thereby to the negative conductor 211 of the direct current supply. The resistance capacity filters for the grids 222 and 223 include, respectively, the series connected resistors 234, 235 and the condensers 236 and 237. The center tap conductor 233 is joined by conductor 215 to the common terminal 190 of the six-phase star connected secondary.

The windings 195A and B have connection by means of the conductors 240 and 241 to the grids 242 and 243, respectively, of the cathode follower tube 244. The plates 245 and 246 are connected by conductors 247 and 248 to the positive side of the direct current source. The cathodes 250 and 251 are connected to the winding 252 which is center tapped by means of the conductor 253 having connection with conductor 211 comprising the negative side of the direct current source. The resistance capacity filters for the grids 242 and 243 include the series connected resistors 254, 255 and the condensers 256 and 257.

The windings 208, 232 and 252 of the cathode followers 202, 224 and 244 comprise the primary windings of three transformers, namely, 260, 278 and 300, and which have inductive relation with secondary windings, respectively, as illustrated in FIGURE 4. Considering first the winding 208 which is center-tapped so that the same is divided into two windings 208A and B, it will be seen that the secondary for the same consists of a winding 261 which is likewise center-tapped to form a pair of windings, namely 261A and 261B. Accordingly, when a voltage from the alternating current supply line is impressed on the primary winding 161 of the delta connected transformer 160, similar voltages are induced in the secondary windings 191A and B and these are accordingly fed to the resistance-capacity filters associated with the cathode follower 202 and which drive the follower so that voltages are developed in the cathode-plate circuit thereof which includes the windings 208A and B. As previously explained, the voltages in said windings are opposed to one another. The inductive relation which the secondary winding 261 has with the primary winding 208 will induce in the secondaries 261A and 261B similar electric voltages which are now exactly one hundred and eighty degrees opposed. The said voltages are supplied by conductors 262 and 263 to the grids 264 and 265 of the electronic tube 266. Said tube is preferably a 12AX7 of the dual triode, hot cathode type, the same having a high mu and sharp cutoff characteristics. The said tube includes a pair of plates 267 and 268 and a pair of cathodes 269. The cathodes are suitably connected to the negative conductor 211 of the direct current supply source, whereas, the plates are connected to the positive conductor 212. The connection including filtering circuits such as the resistor 270 and condenser 271 for plate 267 and resistor 272 and condenser 273 for plate 268. Also connected in circuit with plate 267 is a primary winding 274 for a transformer designated by numeral 275 and in a similar manner primary winding 276 of transformer 277 is included in the circuit with plate 268.

The cathode follower tube 224 having the winding 232 in its plate-cathode circuit will likewise produce voltages in windings 232A and 232B in response to those developed in the primary winding 162 of the delta connected transformer 160. The winding 232 comprises the primary of transformer 278, having a secondary winding 280, the same being center-tapped to form a pair of windings 280A and B. Through conductors 281 and 282 the voltages from winding 280 are fed to the grids 283 and 284, respectively, of an electronic tube 285 having plates 286, 287 and cathodes 288. The circuit to plate 286 includes a resistance-capacity filter formed by the resistor 290 and the condenser 291. Also the primary winding 292 of a transformer 293 has connection in the said plate circuit. Plate 287 is similarly connected to a filter formed by resistor 294 and condenser 295. The winding 296 is in circuit therewith and the same comprises the primary winding of a transformer 297.

The voltages produced in winding 252 of the cathode follower 244 are in response to voltages developed in the winding 163 of the delta connected transformer 160. Since winding 252 is center-tapped the voltages in 252A and 252B will be opposed. Winding 301 of transformer 300 has inductive relation with winding 252 and the same is center-tapped as shown to form windings 301A and B. By means of the conductors 302, 303 the voltages from said secondary windings are delivered to the grids 304, 305 of an electronic tube 306. Said tube includes plates 307 and 308 and a pair of cathodes 309. The resistor 310 and condenser 311 form a resistance-capacity filter in the circuit with plate 307, the circuit also including primary winding 312 of transformer 313. The resistance-capacity filter for plate 308 includes the resistor 314 and condenser 315. The primary winding 316 of transformer 317 is also included in the circuit to said plate.

It will be understood from the foregoing that the output transformers of the cathode followers produce the alternating current component of the synthesized waveforms and it will be further understood that the same is applied to the grids of the electronic tubes 266, 285 and 306. The plate circuits of these tubes include the primary windings of transformers such as 275, 277 for tube 266, transformers 293, 297 for tube 285, and transformers 313 and 317 for tube 306. The primary windings for these transformers develop electric pulses across their terminals whenever their associated tube is driven from cutoff to conduction or vice versa. The pulse is of one polarity when the tube is driven from cutoff to conduction and is of the opposite polarity when driven from conduction to cutoff.

A secondary winding is associated with the primary winding of each transformer, as shown in FIGURE 5, and the same is connected in such a way that a positive pulse is produced when the tube is driven from cutoff to conduction. The pulses therefore comprise the six firing pulses required for firing the ignitrons of the three-phase welding machine. For a more particular disclosure of the manner and circuitry such as may be employed in triggering the ignitrons of the welding machine reference is made to the Solomon Patent 2,600,519, granted June 17, 1952 and entitled Sequence Control Circuit and Timer.

The reference voltage, as previously explained, can be preset and its particular setting determines the firing angles for the voltage compensating circuit. In the schematic diagram of FIGURE 1 it will be seen that the direct current reference voltage has been set so as to produce firing pulses which are phase-shifted. Although the direct current voltage reference level remains fixed, it will be observed that the direct current voltage of the rectifier 180 will vary in value according to variations in the voltage of the alternating currents supplied to the three-phase delta connected transformer 160. Accordingly, the synthesized waveforms are shifted in position with respect to the reference level and the firing angles are either advanced or retarded to compensate for the line voltage variations.

The direct current for the cathode followers 202, 224 and 244 and for the electronic tubes 266, 285 and 306 is obtained from the alternating current supply source through transformer 320 having the secondary winding 321 and which is center-tapped by conductor 211, which accordingly forms the negative side of the direct current source. The rectifiers 324 are in circuit with winding 321 and the same form therewith a full wave rectifier, the output of which is supplied to the positive conductor 212 of the system. The condensers 323 and 325 are connected in parallel across the direct current source and by means of conductor 326 the negative side of the direct current source is connected to the low limit potentiometer 327. The regulator tube 328 has connection to resistor 322 and the combination is connected across the source of direct current. The regulator tube is gas filled and is of the cold cathode type. In operation the same will supply a fixed output voltage irrespective of voltage changes as regards the supply current and irrespective of any changes which may take place in the load. The conductor 331 joins the tube to the high limit potentiometer 332. To provide for adjustment of the direct current voltage reference level a voltage divider 334 is provided which is of a type to give vernier control with no gaps. The resistors 335 are connected to potentiometer 327. In a similar manner resistors 336 are connected to potentiometer 332. The dividers 337 are adapted to make selective connection with resistors 335 and 336 so that as the resistors 335 are added the circuit resistors 336 are cut out. The dividers have connection respectively to the terminals of the potentiometer 338 and the pointer 340 of said potentiometer is connected by conductor 341 to pointer 342 of potentiometer 181, thereby completing the direct current circuit from the regulator tube 328 to rectifier 180.

The conductor 344 has connection at 345 to the negative conductor 182 of the twelve-phase rectifier 180 and said conductor 344 has also a center-tap connection 346 to each of the secondary windings 261, 280 and 301. This connection of the rectifier to the grid circuits of the electronic tubes 266, 285 and 306 functions to add the direct current component of the synthesized waveforms to the alternating current component which is produced in the split secondary windings 261, 280 and 301 by the cathode follower tubes, all as described. It will also be understood that the direct current voltage obtained from regulator tube 328 and which is adjustable in value by means of the voltage divider and potentiometer 338, is applied to the grid-cathode circuit of the tubes 266, 285 and 306. Thus the same provides the level on the synthesized waveforms at which the tubes will conduct and is the means for setting the desired firing points.

Reference is made to FIGURE 5 for an illustration of the transformer arrangement for supplying the firing pulses to the ignitrons and the three-phase welding machine. The transformers 275, 277, 293, 297, 313 and 317 are provided with secondary windings designated, respectively, by numerals 348, 349, 350, 351, 352 and 353. A resistor such as 354 is connected across the terminals of each secondary winding and one end of each winding is connected to the common conductor 355 having the output terminal 356. The other output terminal for secondary winding 348 is indicated by numeral 357 and for the remaining windings by the numerals 358 and 362, respectively. The pulses produced in windings 348 and 349 relate back to the primary winding 161 of the poly-phase transformer 160. Assuming that the pulse in 348 is positive, then a positive pulse will be produced in 349 one hundred and eighty degrees later. The phase shift setting for the voltage compensating circuit, namely, the direct current reference level, will determine the instant in the half cycles of the line voltages, at which the pulses in 348 and 349 will occur, the said phase shifting being continuous and automatically compensating for voltage changes in the poly-phase power supply. In a similar manner the pulses produced in windings 350 and 351 relate back to winding 162 of the transformer 160 and are phase shifted in like manner, and if the pulse in 350 is positive at a particular time, then the pulse in 351 will be positive and one hundred and eighty degrees later. Likewise, for windings 352 and 353 the pulses developed therein are also similarly phase shifted and occur in the same time relation and they relate back to primary winding 163 of transformer 160. In the operation of a three-phase welding machine it should be understood that the positive pulses for windings 348, 350 and 352 will be employed in a manner to produce a unidirectional welding current and following the same the next welding current is produced by employing the positive pulses from windings 349, 351 and 353.

This application is a division of my copending application Serial No. 777,774, filed December 2, 1958 and entitled Automatic Voltage Compensator, now abandoned.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a voltage compensating circuit, the combination with a poly-phase alternating current supply, of a dual-triode electric valve for each phase having a primary winding connected to the cathodes thereof and having a resistance-capacity network connected to each grid, means coupling the grid-cathode circuits of each valve with its respective phase of the alternating current supply and in a manner whereby each valve will have push-pull operation so that the primary winding having connection with each valve will be center tapped providing two sections, means rectifying the poly-phase alternating current to produce a direct current voltage which will vary in magnitude as the voltages of the alternating current supply may vary, a second group of dual-triode electric valves including one for each phase, a secondary winding inductively associated with each said primary winding and having connection with the grids of a valve of the second group, means connecting the rectifier to the grid-cathode circuits of the second group of valves including a conductor having a center-tapped relation with each secondary winding to provide two sections respectively, a primary winding in each plate-cathode circuit of said second group of valves and wherein phase-shifted electric pulses are produced as a result of operation of the valves, and a regulator valve capable of producing a direct current voltage and which is also supplied to the grid-cathode circuits of the second group of valves for setting a voltage level in excess of which the valves will conduct.

2. In a voltage compensating circuit as defined by claim 1, wherein the regulator valve will deliver a direct current voltage which will be relatively constant, and additionally including a voltage divider resistance network for adjusting the direct current voltage output of the regulator valve as supplied to the grid-cathode circuits of the second group of valves.

3. In a voltage compensating circuit, the combination with a poly-phase alternating current supply, of a dual-triode electric valve for each phase having a primary winding in series circuit with the cathodes thereof and having a resistance-capacity network connected to each grid, inductive means in the form of a winding for each phase and which have a star-connected relation, a conductor joining each resistance-capacity network with an end of a winding and another conductor joining the star connection of the inductive means with the primary windings respectively in a manner to center-tap the same whereby the valves are connected for push-pull operation, means rectifying the poly-phase alternating current to produce a direct current voltage which will vary in magnitude as the voltages of the alternating current supply may vary, a second group of dual-triode electric valves including one for each phase, a secondary winding inductively associated with each said primary winding and having connection with the grids of a valve of the second group, means connecting the rectifier in the grid-cathode circuits of the second group of valves including a conductor having a center-tapped relation with each secondary winding to provide two sections, a primary winding in each plate-cathode circuit of said second group of valves and wherein phase-shifted electric pulses are produced as a result of conduction of the valves, and a regulator valve capable of producing a direct current voltage and which is also supplied to the grid-cathode circuits of the second group of valves for setting a voltage level in excess of which the valves will conduct.

4. In a voltage compensating circuit for three-phase alternating current, the combination with transformer structure having three delta-connected primary windings, at least two sets of delta-connected secondary windings and a third set of star-connected secondary windings, of a rectifier, connections between the rectifier and the said sets of delta-connected secondary windings so arranged as to rectify the alternating currents induced in the secondary windings in a manner to produce a direct current voltage having a ripple of low amplitude and high frequency and which will vary in magnitude as the voltages of the alternating current source may vary, a plurality of dual-triode electric valves each having a primary winding in electrical connection with the cathodes thereof, conductors connecting the windings of the star-connected secondary and the said primary windings of the valves to form the grid-cathode circuits of said valves respectively to thereby connect them for push-pull operation, certain of said conductors including a resistance-capacity network, a secondary winding in inductive relation with each primary winding of said valves, a pair of electric valves for each secondary winding, conductors connecting the grids of said last mentioned electric valves to the secondary windings respectively, a primary winding in each plate-cathode circuit of each last mentioned electric valve and wherein phase-shifted electric pulses are produced upon operation of its particular valve, a conductor having a center-tapped relation with each secondary winding, said conductors being joined to said rectifier for supplying the rectified voltage to the grid-cathode circuits of the last mentioned electric valves, and biasing means for the grids of said last mentioned electric valves for setting a direct current voltage level in excess of which the said valves are caused to become conductive.

5. In a voltage compensating circuit, the combination with a source of three-phase alternating current voltage, of a transformer having three delta-connected primary windings connected across respective phases of the source, a plurality of sets of secondary windings for said transformer, a rectifier, connections between the rectifier and at least two sets of secondary windings for rectifying the alternating currents induced in the secondary windings whereby to produce a direct current voltage, the magnitude of which will vary as the voltages of the alternating current source may vary, the third set of secondary windings being star-connected, a plurality of dual-triode electric valves each having a center-tapped primary winding in electrical connection with the cathodes thereof, connections between the windings of the star-connected secondary, the center-tap of said primary windings and the grids of said electric valves, respectively, thereby connecting each valve for push-pull operation, certain connections including a resistance-capacity filter, a center-tapped secondary winding in inductive relation with each center-tapped primary winding, a dual-triode electric valve for each secondary winding, conductors connecting the grids of said last mentioned electric valves with the said secondary windings, respectively, a primary winding in each plate-cathode circuit of each last mentioned electric valve and wherein phase-shifted electric pulses are produced when conduction occurs in its triode section, a conductor having a center-tapped relation with each last mentioned secondary winding, said conductor being joined to the said rectifier for supplying the rectified voltage to the grid-cathode circuits of the last mentioned electric valves, and means including a regulator valve capable of delivering a constant direct current voltage and which is also suppled to the grid-cathode circuits of said last mentioned electric valves.

6. A method of compensating for voltage variations in the three-phase alternating current supply as delivered to a three-phase welding machine whereby to obtain welding currents having uniform heating effects, the steps which include the rectification of the three voltages of the alternating current supply to produce a direct current voltage which will vary in magnitude as the alternating current voltages may vary, obtaining alternating current voltages from each phase of the supply source by induction, filtering each alternating current voltage and feeding the same to electric valves respectively of a type connected by circuitry for push-pull cathode follower operation, whereby the output of the said cathode follower circuitry comprises the alternating current component of synthesized waveforms as obtained for each phase of the source, combining the outputs of the said cathode follower circuitry with the rectified direct current voltage, the latter comprising the direct current component of the synthesized waveforms, and obtaining from said synthesized waveforms firing pulses at variable phase angles with respect to their particular alternating current supply voltage as determined by the variations in the magnitude of the rectified direct current voltage.

No references cited.